US008949743B2

(12) United States Patent
Kida et al.

(10) Patent No.: US 8,949,743 B2
(45) Date of Patent: Feb. 3, 2015

(54) LANGUAGE INPUT INTERFACE ON A DEVICE

(75) Inventors: Yasuo Kida, Palo Alto, CA (US);
Deborah Eileen Goldsmith, Los Gatos, CA (US); Elizabeth Caroline Furches, San Francisco, CA (US); Leland Douglas Collins, Jr., Palo Alto, CA (US); Ken Kocienda, Sunnyvale, CA (US); Bas Ording, San Francisco, CA (US); Toshiyuki Masui, Palo Alto, CA (US); Yosuke Kurita, San Jose, CA (US); Shin Nishibori, Portola Valley, CA (US); Takumi Takano, Chofu (JP); Hongwei Guo, Cupertino, CA (US); Maria Celia Vigil, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 742 days.

(21) Appl. No.: 12/107,711

(22) Filed: Apr. 22, 2008

(65) Prior Publication Data
US 2009/0265669 A1    Oct. 22, 2009

(51) Int. Cl.
*G06F 3/0481*    (2013.01)
(52) U.S. Cl.
USPC ........... 715/863; 715/841; 715/864; 715/773; 715/835
(58) Field of Classification Search
USPC .......................... 715/864, 841, 863, 773, 835
See application file for complete search history.

(56) References Cited

U.S. PATENT DOCUMENTS

| 5,379,057 | A | | 1/1995 | Clough et al. |
| 5,483,261 | A | | 1/1996 | Yasutake |
| 5,488,204 | A | | 1/1996 | Mead et al. |
| 5,535,119 | A | * | 7/1996 | Ito et al. ............................ 704/3 |
| 5,675,362 | A | | 10/1997 | Clough et al. |
| 5,825,352 | A | | 10/1998 | Bisset et al. |
| 5,835,079 | A | | 11/1998 | Shieh |
| 5,880,411 | A | | 3/1999 | Gillespie et al. |
| 5,959,629 | A | | 9/1999 | Masui |
| 6,115,053 | A | * | 9/2000 | Perlin ........................... 345/475 |
| 6,188,391 | B1 | | 2/2001 | Seely et al. |
| 6,310,610 | B1 | | 10/2001 | Beaton et al. |

(Continued)

FOREIGN PATENT DOCUMENTS

| CN | 1949158 | 4/2007 |
| EP | 1 698 982 | 9/2006 |

(Continued)

OTHER PUBLICATIONS

T. Matsui, "An Efficient Text Input Method for Pen-based Computers," Proceedings of the ACM Conference on Human Factors in Computing System (CHI '98), Apr. 1998, ACM press, pp. 328-335.

(Continued)

*Primary Examiner* — Namitha Pillai
(74) *Attorney, Agent, or Firm* — Morrison & Foerster, LLP

(57) ABSTRACT

Methods, systems, devices, and apparatus, including computer program products, for inputting text. A user interface element is presented on a touch-sensitive display of a device. The user interface element is associated with a plurality of characters, at least a subset of which is associated with respective gestures. A user input performing a gesture with respect to the user interface element is received. The character from the subset that is associated with the gesture performed with respect to the user interface element is inputted.

20 Claims, 16 Drawing Sheets

(56) References Cited

U.S. PATENT DOCUMENTS

| | | |
|---|---|---|
| 6,323,846 B1 | 11/2001 | Westerman et al. |
| 6,570,557 B1 | 5/2003 | Westerman et al. |
| 6,661,409 B2 | 12/2003 | Demartines et al. |
| 6,677,932 B1 | 1/2004 | Westerman |
| 6,690,387 B2 | 2/2004 | Zimmerman et al. |
| 6,888,536 B2 | 5/2005 | Westerman et al. |
| 7,015,894 B2 | 3/2006 | Morohoshi |
| 7,030,863 B2 | 4/2006 | Longe et al. |
| 7,096,432 B2 | 8/2006 | Huapaya et al. |
| 7,147,562 B2 | 12/2006 | Ohara et al. |
| 7,184,064 B2 | 2/2007 | Zimmerman et al. |
| 7,530,031 B2 | 5/2009 | Iwamura et al. |
| 7,554,529 B2 | 6/2009 | Kotipalli |
| 7,663,607 B2 | 2/2010 | Hotelling et al. |
| 8,479,122 B2 | 7/2013 | Hotelling et al. |
| 2002/0167545 A1 | 11/2002 | Kang et al. |
| 2002/0168107 A1 | 11/2002 | Tang et al. |
| 2003/0160817 A1* | 8/2003 | Ishida et al. ......... 345/738 |
| 2003/0216913 A1 | 11/2003 | Keely |
| 2004/0140956 A1 | 7/2004 | Kushler et al. |
| 2004/0230912 A1 | 11/2004 | Clow et al. |
| 2005/0099408 A1 | 5/2005 | Seto et al. |
| 2005/0152600 A1 | 7/2005 | Chen et al. |
| 2005/0174333 A1 | 8/2005 | Robinson et al. |
| 2006/0026521 A1 | 2/2006 | Hotelling et al. |
| 2006/0053387 A1 | 3/2006 | Ording |
| 2006/0085757 A1 | 4/2006 | Andre et al. |
| 2006/0117067 A1 | 6/2006 | Wright et al. |
| 2006/0144211 A1 | 7/2006 | Yoshimoto |
| 2006/0197753 A1 | 9/2006 | Hotelling |
| 2006/0274051 A1 | 12/2006 | Longe et al. |
| 2007/0120822 A1 | 5/2007 | Iso |
| 2008/0094356 A1 | 4/2008 | Ording et al. |
| 2009/0037837 A1 | 2/2009 | Raghunath et al. |
| 2009/0058823 A1 | 3/2009 | Kocienda |
| 2009/0077464 A1 | 3/2009 | Goldsmith et al. |
| 2009/0225041 A1 | 9/2009 | Kida et al. |
| 2009/0226091 A1 | 9/2009 | Goldsmith et al. |

FOREIGN PATENT DOCUMENTS

| | | |
|---|---|---|
| JP | 08-272787 | 10/1996 |
| JP | 10-049272 | 2/1998 |
| JP | 2000-089886 A | 3/2000 |
| JP | 2000-112636 | 4/2000 |
| JP | 2000-163031 A | 6/2000 |
| JP | 2002-108543 | 4/2002 |
| JP | 03-314276 | 8/2002 |
| JP | 2002-325965 | 11/2002 |
| JP | 2002-342033 A | 11/2002 |
| JP | 2003-216312 A | 7/2003 |
| JP | 2005-092441 | 4/2005 |
| JP | 2006-510335 A | 3/2006 |
| JP | 2007-041726 A | 2/2007 |
| JP | 2009-520271 A | 5/2009 |
| WO | WO 00/74240 | 12/2000 |
| WO | WO-2004/059424 A2 | 7/2004 |
| WO | WO-2004/059424 A3 | 7/2004 |
| WO | WO 2005/064587 | 7/2005 |
| WO | WO 2007/037809 | 4/2007 |
| WO | WO 2007/047188 | 4/2007 |
| WO | 2007/070223 | 6/2007 |
| WO | WO 2009/032483 | 3/2009 |
| WO | WO 2009/111138 | 9/2009 |

OTHER PUBLICATIONS

T. Matsui, POBox: "An Efficient Text Input Method for Handheld and Ubiquitous Computers," Proceedings of the International Symposium on Handheld and Ubiquitous Computer (HUC '99), Sep. 1999, pp. 289-300.

C. Liu et al., "Online Recognition of Chinese Characters: The State-of-the-Art," IEEE Tranactions on Pattern Analysis and Machine Intelligence, vol. 26, No. 2, Feb. 2004, pp. 198-213.

H. Sacher, "Interactions in Chinese: Designing Interfaces for Asian Languages," Interactions Magazine, vol. 5, Issue 5, Sep.-Oct. 1998, pp. 28-38.

Authorized officer Philippe Becamel, International Preliminary Report on Patentability in PCT/US2009/033696 mailed Sep. 16, 2010, 7 pages.

International Preliminary Report on Patentability in International Application No. PCT/US2009/072803 mailed Mar. 18, 2010.

Translated First Office Action dated Jul. 29, 2010 issued in Chinese Application No. 200910118235.X, 9 pages.

International Search Report and Written Opinion, dated Apr. 29, 2009, issued in International Application No. PCT/US2009/033696.

International Search Report and Written Opinion, dated Feb. 18, 2009, issued in International Application No. PCT/US2009/072803.

Invitation to Pay Fees and Partial International Search Report, dated Nov. 11, 2008, issued in International Application No. PCT/US2009/072803.

Goldsmith et al., "Identification of Candidate Characters for Text Input", U.S. Appl. No. 12/167,044, filed Jul. 2, 2008.

Chou, "Zhuyin Input Interface on a Device", U.S. Appl. No. 12/476,121, filed Jun. 1, 2009.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

LANGUAGE INPUT INTERFACE ON A DEVICE

BACKGROUND

The subject matter of this specification is related generally to text input interfaces.

Traditional computer keyboards may be too large for portable devices, such as mobile phones, multimedia players, or personal digital assistants (PDAs). Some portable devices include a smaller version of the traditional computer keyboard or use a virtual keyboard to receive user input. A virtual keyboard can be of the form of a software application or a feature of a software application to simulate a computer keyboard. For example, in a portable device with a touch-sensitive display, a virtual keyboard can be used by a user to input text by selecting or tabbing areas of the touch-sensitive display corresponding to keys of the virtual keyboard.

These smaller keyboards and virtual keyboards may have keys that correspond to more than one character. For example, some of the keys can, by default, correspond to a character in the English language, for example, the letter "a," and may also correspond to other additional characters, such as another letter or the letter with an accent option, e.g., the character "ä," or other characters with accent options. Because of the physical limitations (e.g., size) of the virtual keyboard, a user may find it difficult to type characters not readily available on the virtual keyboard.

Input methods for devices having multi-language environments can present unique challenges with respect to input and spelling correction which may need to be tailored to the selected language to ensure accuracy and an efficient workflow.

SUMMARY

In general, one aspect of the subject matter described in this specification can be embodied in methods that include the actions of presenting a user interface element on a touch-sensitive display of a device, the user interface element being associated with a plurality of characters, where each of at least a subset of the plurality of characters is associated with a respective gesture with respect to the user interface element; receiving user input performing a gesture with respect to the user interface element; and inputting the character from the subset that is associated with the gesture performed with respect to the user interface element. Other embodiments of this aspect include corresponding systems, apparatus, devices, computer program products, and computer readable media.

In general, another aspect of the subject matter described in this specification can be embodied in methods that include the actions of receiving user input performing a gesture with respect to a user interface element on a touch sensitive display of a device, where the user interface element is associated with a plurality of Japanese kana symbols; and inputting one of the plurality of Japanese kana symbols based on the gesture with respect to the user interface element. Other embodiments of this aspect include corresponding systems, apparatus, devices, computer program products, and computer readable media.

In general, another aspect of the subject matter described in this specification can be embodied in methods that include the actions of presenting a plurality of user interface elements on a touch-sensitive display of a device, each of the user interface elements being associated with a respective plurality of characters; receiving user input performing one or more gestures with respect to the user interface elements; and inputting one or more characters from the respective plurality of characters based on the gestures. Other embodiments of this aspect include corresponding systems, apparatus, devices, computer program products, and computer readable media.

Particular embodiments of the subject matter described in this specification can be implemented to realize one or more of the following advantages. Symbols and characters can be input more efficiently using a virtual keypad on a portable device. Characters that are later in a multi-tap character sequence can be entered more quickly.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Example Mobile Device

Figure 1:
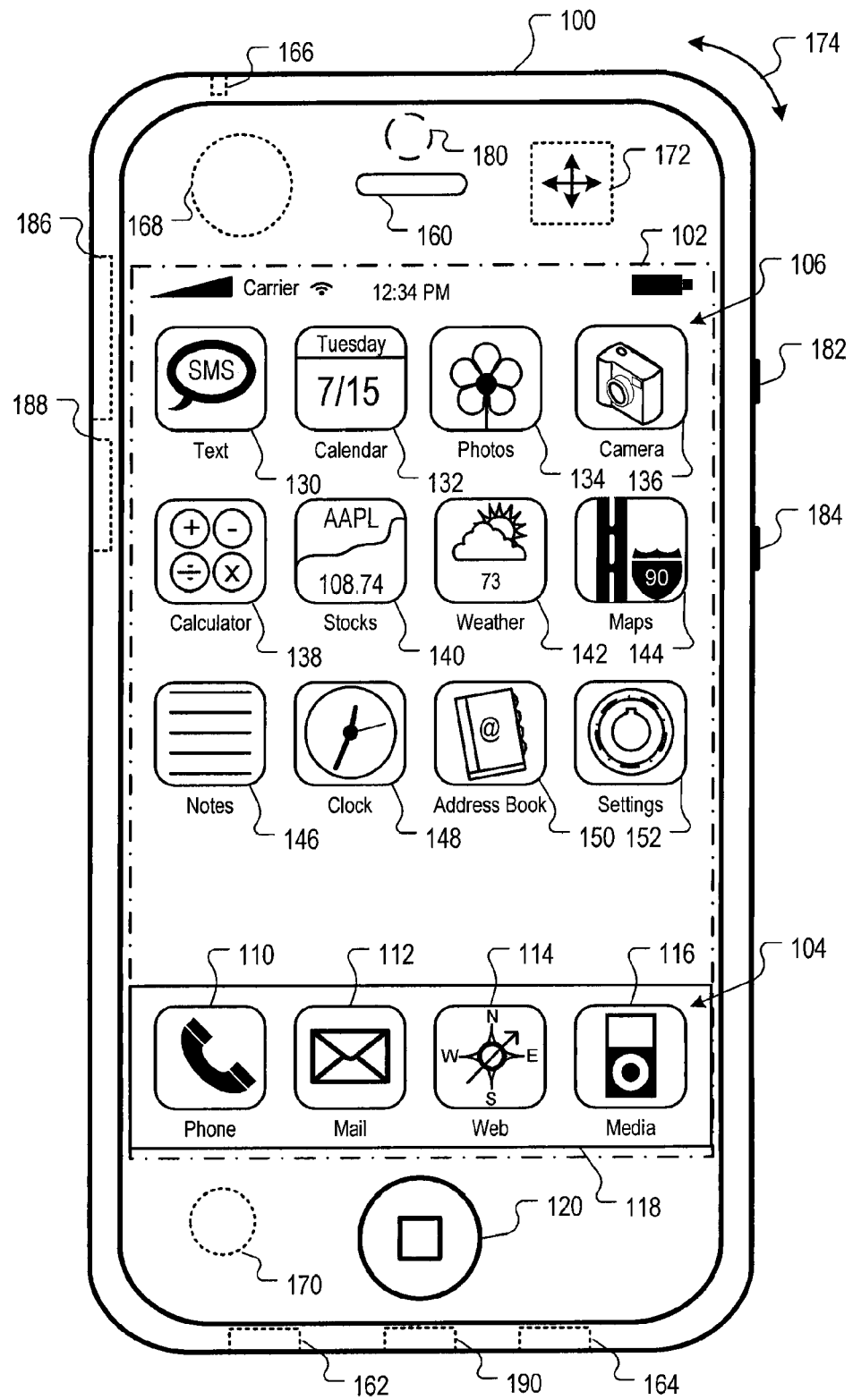
FIG. 1 is a block diagram of an example mobile device.

FIG. 1 is a block diagram of an example mobile device 100. The mobile device 100 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

Mobile Device Overview

In some implementations, the mobile device 100 includes a touch-sensitive display 102. The touch-sensitive display 102 can implement liquid crystal display (LCD) technology, light emitting polymer display (LPD) technology, or some other display technology. The touch sensitive display 102 can be sensitive to haptic and/or tactile contact with a user.

In some implementations, the touch-sensitive display 102 can comprise a multi-touch-sensitive display 102. A multi-touch-sensitive display 102 can, for example, process multiple simultaneous touch points, including processing data related to the pressure, degree, and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570,557, 6,677,932, and 6,888,536, each of which is incorporated by reference herein in its entirety.

In some implementations, the mobile device 100 can display one or more graphical user interfaces on the touch-sensitive display 102 for providing the user access to various system objects and for conveying information to the user. In some implementations, the graphical user interface can include one or more display objects 104, 106. In the example shown, the display objects 104, 106, are graphic representations of system objects. Some examples of system objects include device functions, applications, windows, files, alerts, events, or other identifiable system objects.

Example Mobile Device Functionality

In some implementations, the mobile device 100 can implement multiple device functionalities, such as a telephony device, as indicated by a phone object 110; an e-mail device, as indicated by the e-mail object 112; a network data communication device, as indicated by the Web object 114; a Wi-Fi base station device (not shown); and a media processing device, as indicated by the media player object 116. In some implementations, particular display objects 104, e.g., the phone object 110, the e-mail object 112, the Web object 114, and the media player object 116, can be displayed in a menu bar 118. In some implementations, device functionalities can be accessed from a top-level graphical user interface, such as the graphical user interface illustrated in FIG. 1. Touching one of the objects 110, 112, 114, or 116 can, for example, invoke corresponding functionality.

In some implementations, the mobile device 100 can implement network distribution functionality. For example, the functionality can enable the user to take the mobile device 100 and provide access to its associated network while traveling. In particular, the mobile device 100 can extend Internet access (e.g., Wi-Fi) to other wireless devices in the vicinity. For example, mobile device 100 can be configured as a base station for one or more devices. As such, mobile device 100 can grant or deny network access to other wireless devices.

In some implementations, upon invocation of device functionality, the graphical user interface of the mobile device 100 changes, or is augmented or replaced with another user interface or user interface elements, to facilitate user access to particular functions associated with the corresponding device functionality. For example, in response to a user touching the phone object 110, the graphical user interface of the touch-sensitive display 102 may present display objects related to various phone functions; likewise, touching of the email object 112 may cause the graphical user interface to present display objects related to various e-mail functions; touching the Web object 114 may cause the graphical user interface to present display objects related to various Web-surfing functions; and touching the media player object 116 may cause the graphical user interface to present display objects related to various media processing functions.

In some implementations, the top-level graphical user interface environment or state of FIG. 1 can be restored by pressing a button 120 located near the bottom of the mobile device 100. In some implementations, each corresponding device functionality may have corresponding "home" display objects displayed on the touch-sensitive display 102, and the graphical user interface environment of FIG. 1 can be restored by pressing the "home" display object.

In some implementations, the top-level graphical user interface can include additional display objects 106, such as a short messaging service (SMS) object 130, a calendar object 132, a photos object 134, a camera object 136, a calculator object 138, a stocks object 140, a weather object 142, a maps object 144, a notes object 146, a clock object 148, an address book object 150, and a settings object 152. Touching the SMS display object 130 can, for example, invoke an SMS messaging environment and supporting functionality; likewise, each selection of a display object 132, 134, 136, 138, 140, 142, 144, 146, 148, 150, and 152 can invoke a corresponding object environment and functionality.

Additional and/or different display objects can also be displayed in the graphical user interface of FIG. 1. For example, if the device 100 is functioning as a base station for other devices, one or more "connection" objects may appear in the graphical user interface to indicate the connection. In some implementations, the display objects 106 can be configured by a user, e.g., a user may specify which display objects 106 are displayed, and/or may download additional applications or other software that provides other functionalities and corresponding display objects.

In some implementations, the mobile device 100 can include one or more input/output (I/O) devices and/or sensor devices. For example, a speaker 160 and a microphone 162 can be included to facilitate voice-enabled functionalities, such as phone and voice mail functions. In some implementations, an up/down button 184 for volume control of the speaker 160 and the microphone 162 can be included. The mobile device 100 can also include an on/off button 182 for a ring indicator of incoming phone calls. In some implementations, a loud speaker 164 can be included to facilitate hands-free voice functionalities, such as speaker phone functions. An audio jack 166 can also be included for use of headphones and/or a microphone.

In some implementations, a proximity sensor 168 can be included to facilitate the detection of the user positioning the mobile device 100 proximate to the user's ear and, in response, to disengage the touch-sensitive display 102 to prevent accidental function invocations. In some implementations, the touch-sensitive display 102 can be turned off to conserve additional power when the mobile device 100 is proximate to the user's ear.

Other sensors can also be used. For example, in some implementations, an ambient light sensor 170 can be utilized to facilitate adjusting the brightness of the touch-sensitive display 102. In some implementations, an accelerometer 172 can be utilized to detect movement of the mobile device 100, as indicated by the directional arrow 174. Accordingly, display objects and/or media can be presented according to a detected orientation, e.g., portrait or landscape. In some implementations, the mobile device 100 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 100 or provided as a separate device that can be coupled to the mobile device 100 through an interface (e.g., port device 190) to provide access to location-based services.

In some implementations, a port device 190, e.g., a Universal Serial Bus (USB) port, or a docking port, or some other wired port connection, can be included. The port device 190 can, for example, be utilized to establish a wired connection to other computing devices, such as other communication devices 100, network access devices, a personal computer, a printer, a display screen, or other processing devices capable of receiving and/or transmitting data. In some implementations, the port device 190 allows the mobile device 100 to synchronize with a host device using one or more protocols, such as, for example, the TCP/IP, HTTP, UDP and any other known protocol.

The mobile device 100 can also include a camera lens and sensor 180. In some implementations, the camera lens and sensor 180 can be located on the back surface of the mobile device 100. The camera can capture still images and/or video.

The mobile device 100 can also include one or more wireless communication subsystems, such as an 802.11b/g communication device 186, and/or a Bluetooth™ communication device 188. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

Example Mobile Device Architecture

Figure 2:
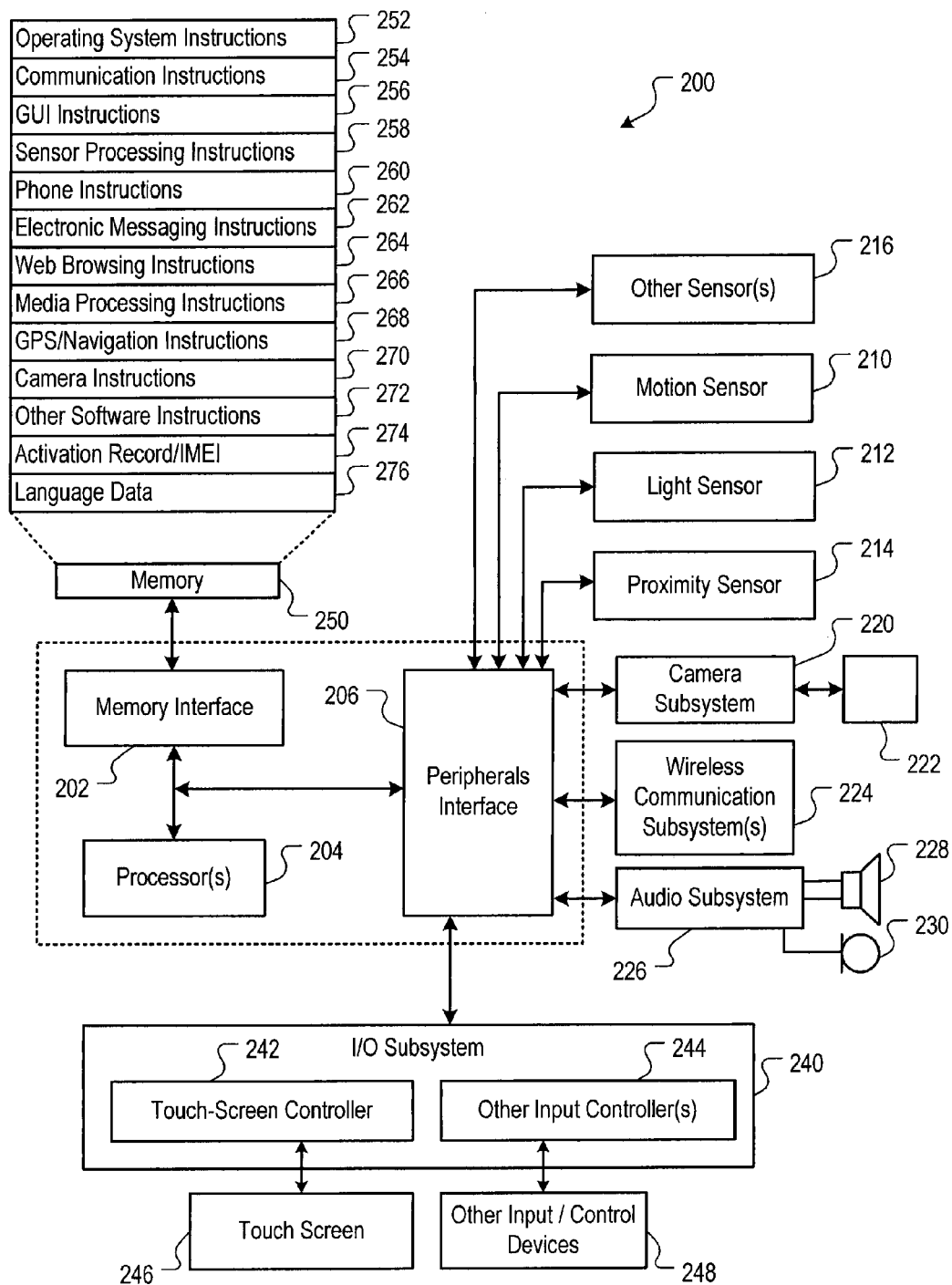
FIG. 2 is a block diagram of an example implementation of the mobile device of FIG. 1.

FIG. 2 is a block diagram 200 of an example implementation of the mobile device 100 of FIG. 1. The mobile device 100 can include a memory interface 202, one or more data processors, image processors and/or central processing units 204, and a peripherals interface 206. The memory interface 202, the one or more processors 204 and/or the peripherals interface 206 can be separate components or can be integrated in one or more integrated circuits. The various components in the mobile device 100 can be coupled by one or more communication buses or signal lines.

Sensors, devices, and subsystems can be coupled to the peripherals interface 206 to facilitate multiple functionalities. For example, a motion sensor 210, a light sensor 212, and a proximity sensor 214 can be coupled to the peripherals interface 206 to facilitate the orientation, lighting, and proximity functions described with respect to FIG. 1. Other sensors 216 can also be connected to the peripherals interface 206, such as a positioning system (e.g., GPS receiver), a temperature sensor, a biometric sensor, or other sensing device, to facilitate related functionalities.

A camera subsystem 220 and an optical sensor 222, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 224, which can include radio frequency receivers and transmitters and/or optical (e.g., infrared) receivers and transmitters. The specific design and implementation of the communication subsystem 224 can depend on the communication network(s) over which the mobile device 100 is intended to operate. For example, a mobile device 100 may include communication subsystems 224 designed to operate over a GSM network, a GPRS network, an EDGE network, a Wi-Fi or WiMax network, and a Bluetooth™ network. In particular, the wireless communication subsystems 224 may include hosting protocols such that the device 100 may be configured as a base station for other wireless devices.

An audio subsystem 226 can be coupled to a speaker 228 and a microphone 230 to facilitate voice-enabled functions, such as voice recognition, voice replication, digital recording, and telephony functions.

The I/O subsystem 240 can include a touch screen controller 242 and/or other input controller(s) 244. The touch-screen controller 242 can be coupled to a touch screen 246. The touch screen 246 and touch screen controller 242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 246.

The other input controller(s) 244 can be coupled to other input/control devices 248, such as one or more buttons, rocker switches, thumb-wheel, infrared port, USB port, and/or a pointer device such as a stylus. The one or more buttons (not shown) can include an up/down button for volume control of the speaker 228 and/or the microphone 230.

In one implementation, a pressing of the button for a first duration may disengage a lock of the touch screen 246; and a pressing of the button for a second duration that is longer than the first duration may turn power to the mobile device 100 on or off. The user may be able to customize a functionality of one or more of the buttons. The touch screen 246 can, for example, also be used to implement virtual or soft buttons and/or a keyboard.

In some implementations, the mobile device 100 can present recorded audio and/or video files, such as MP3, AAC, and MPEG files. In some implementations, the mobile device 100 can include the functionality of an MP3 player, such as an iPod™. The mobile device 100 may, therefore, include a 30-pin connector that is compatible with the iPod™. Other input/output and control devices can also be used.

The memory interface 202 can be coupled to memory 250. The memory 250 can include high-speed random access memory and/or non-volatile memory, such as one or more magnetic disk storage devices, one or more optical storage devices, and/or flash memory (e.g., NAND, NOR). The memory 250 can store an operating system 252, such as Darwin, RTXC, LINUX, UNIX, OS X, WINDOWS, or an embedded operating system such as VxWorks. The operating system 252 may include instructions for handling basic system services and for performing hardware dependent tasks. In some implementations, the operating system 252 can be a kernel (e.g., UNIX kernel).

The memory 250 may also store communication instructions 254 to facilitate communicating with one or more additional devices, one or more computers and/or one or more servers. The memory 250 may include graphical user interface instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GPS/Navigation instructions 268 to facilitate GPS and navigation-related processes and instructions; camera instructions 270 to facilitate camera-related processes and functions; and/or other software instructions 272 to facilitate other processes and functions, e.g., security processes and functions. The memory 250 may also store other software instructions (not shown), such as web video instructions to facilitate web video-related processes and functions; and/or web shopping instructions to facilitate web shopping-related processes and functions. In some implementations, the media processing instructions 266 are divided into audio processing instructions and video processing instructions to facilitate audio processing-related processes and functions and video processing-related processes and functions, respectively. An activation record and International Mobile Equipment Identity (IMEI) 274 or similar hardware identifier can also be stored in memory 250.

Language data 276 can also be stored in memory 250. Language data 276 can include, for example, word dictionaries (i.e., list of possible words in a language) for one or more languages, dictionaries of characters and corresponding phonetics, one or more corpuses of characters and character compounds, and so on.

Each of the above identified instructions and applications can correspond to a set of instructions for performing one or more functions described above. These instructions need not be implemented as separate software programs, procedures, or modules. The memory 250 can include additional instructions or fewer instructions. Furthermore, various functions of the mobile device 100 may be implemented in hardware and/or in software, including in one or more signal processing and/or application specific integrated circuits.

Text Input Interface

FIGS. 3A-3E illustrate an example user interface for inputting or entering text on mobile device 100. Mobile device 100 can display a text presentation area 302 and a text entry area 301 on the touch-sensitive display 102. The text presentation area 302 can be any area where input text can be displayed or presented, e.g., a note-taking application, an email application, and so on. In some implementations, the text presentation area 302 is one or more text fields (e.g., a text field in a web page).

The text entry area 301 includes one or more user interface elements that can be used by a user to enter letters, numbers, symbols, characters, etc. (hereinafter collectively referred to as "characters" for convenience) on the mobile device 100. In some implementations, the user interface elements can include one or more virtual keys 304 that are each associated with one or more characters.

The text entry area 301 can include other user interface elements. Examples of other user interface elements that can be included in the text entry area 301 include an input method switching key 316 for switching between input user interfaces for one or more languages (e.g., QWERTY keyboard, handwriting recognition, etc.), a number pad key 318 for switching to a keypad for entering numbers and related symbols (e.g., mathematical symbols), a sound modifier key 320 for inputting diacritic marks and other sound modifications (e.g., dakuten, handkuten, and small っ for Japanese), language-specific punctuation key 322 for inputting language-specific punctuation marks (e.g., Japanese punctuation), delete/backspace key 324 for deleting entered text, an "next" key 326 for accepting the currently activated character in the text input (and optionally inputting a white space), and return key 328 for entering line breaks. Other user interface elements are possible. For example, a candidates key (e.g., candidates key 330, FIG. 7) for bringing up a list of candidate completions or replacements for the current input string can be included. As another example, a key for bringing up a list of symbols, emoticons, and the like can be included.

For a virtual key 304 that is associated with a plurality of characters, the characters associated with the key can be entered by multi-tap. For example, a user can tap the virtual key in succession to cycle through the characters in a predetermined order. As the user taps the virtual key and cycles through the characters, the currently activated character can be displayed in the text presentation area 302. To accept the currently activated character, the user can stop tapping the key until a predetermined amount of time has elapsed, the user taps a different character key (e.g., to cycle through another set of characters), or tap another key that includes the functionality of accepting the currently activated character (e.g., tapping "next" key 326). Thus, a character can be entered based on a number of taps from a standby state or a zero-tap count on the virtual key.

In some implementations, a multi-tap order toggle key (not shown) can be included. A user can use the multi-tap order toggle key to reverse the character ordering of the keys, so that characters that are normally at the tail end of the ordering, and thus take several taps to enter, can be entered with one or a few taps. Tapping the key again reverts the character ordering to the original order.

In some implementations, each of the virtual keys 304 is associated with one or more Japanese kana symbols, or basic Japanese sounds that can be represented by kana symbols. For example, one key can be associated with the kana あ, い, う, え, お; another key can be associated with the kana か, き, く, け, こ; ; and so on. In some implementations, the virtual keys 304 are associated with kana symbols in accordance with the gojúon ordering of kana.

The kana symbols for a virtual key 304 can be entered using multi-tap; a user can tap a key in succession to cycle through the kana symbols for that key in gojúon order. For example, in FIG. 3B, a user can tap key 306 in succession to cycle through the kana symbols associated with the key, which in the case of key 306, are the kana あ, い, う, え, お. Tapping key 306 once enters あ (shown in the text presentation area 302 as the current input 303); tapping key 306 again in succession enters い, and so on.

In some implementations, a user can enter at least some of the characters associated with a user interface element (e.g., a virtual key 304) by performing gestures with respect to the user interface element, as well as by multi-tap. For example, one or more of the characters associated with a virtual key can each be associated with respective gestures that can be performed with respect to the virtual key. A user can enter a particular character by performing the corresponding gesture with respect to the particular virtual key.

In some implementations, the respective gestures are flicks in different directions from the virtual key. For a virtual key, the characters associated with a user interface element can each be assigned to respective flick directions with respect to the user interface element. A flick in a particular direction with respect to the user interface element selects the character associated with the user interface element and assigned to that direction.

Figure 3A:
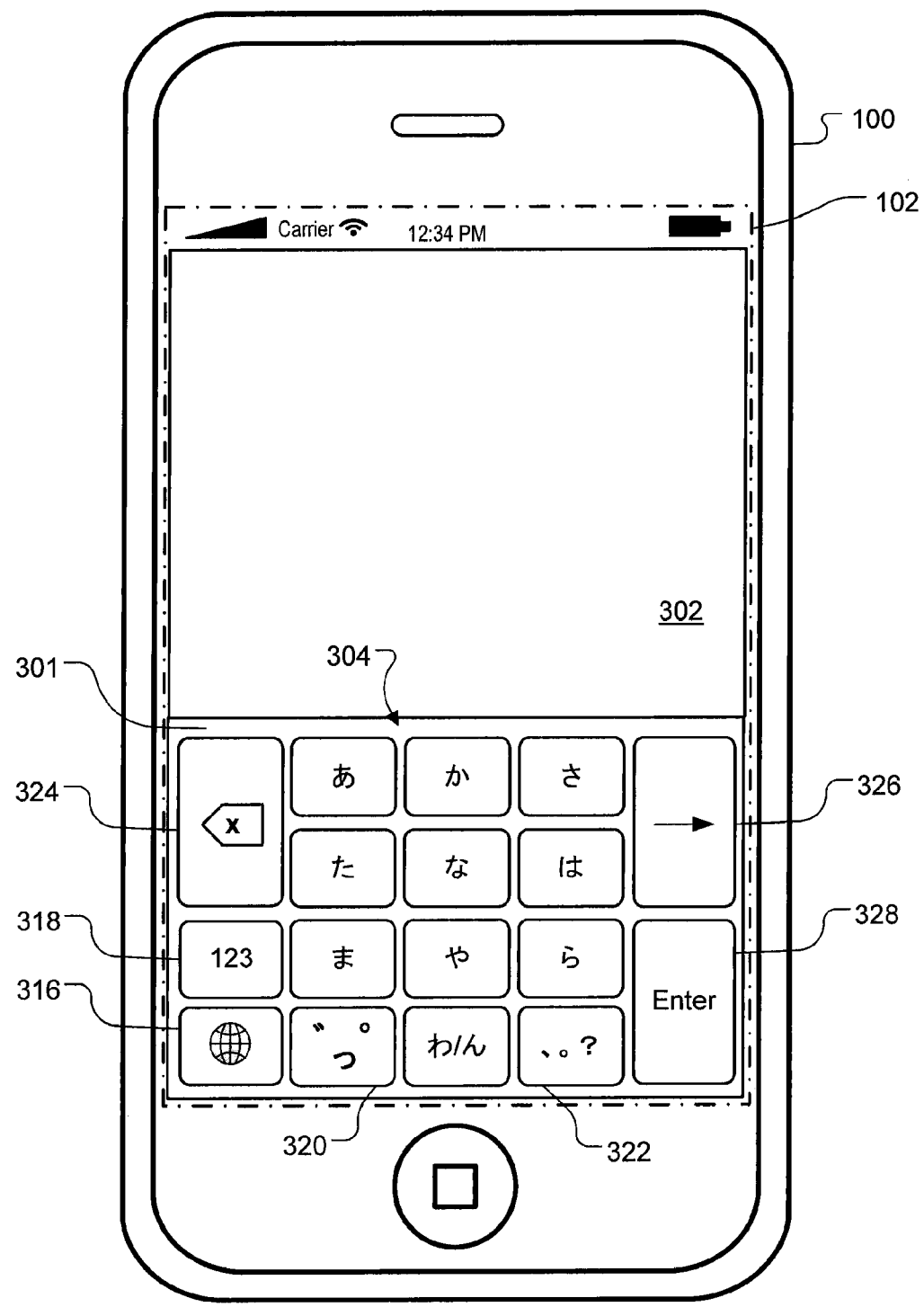
FIGS. 3A-3F illustrate an example user interface for entering text.
Figure 3B:
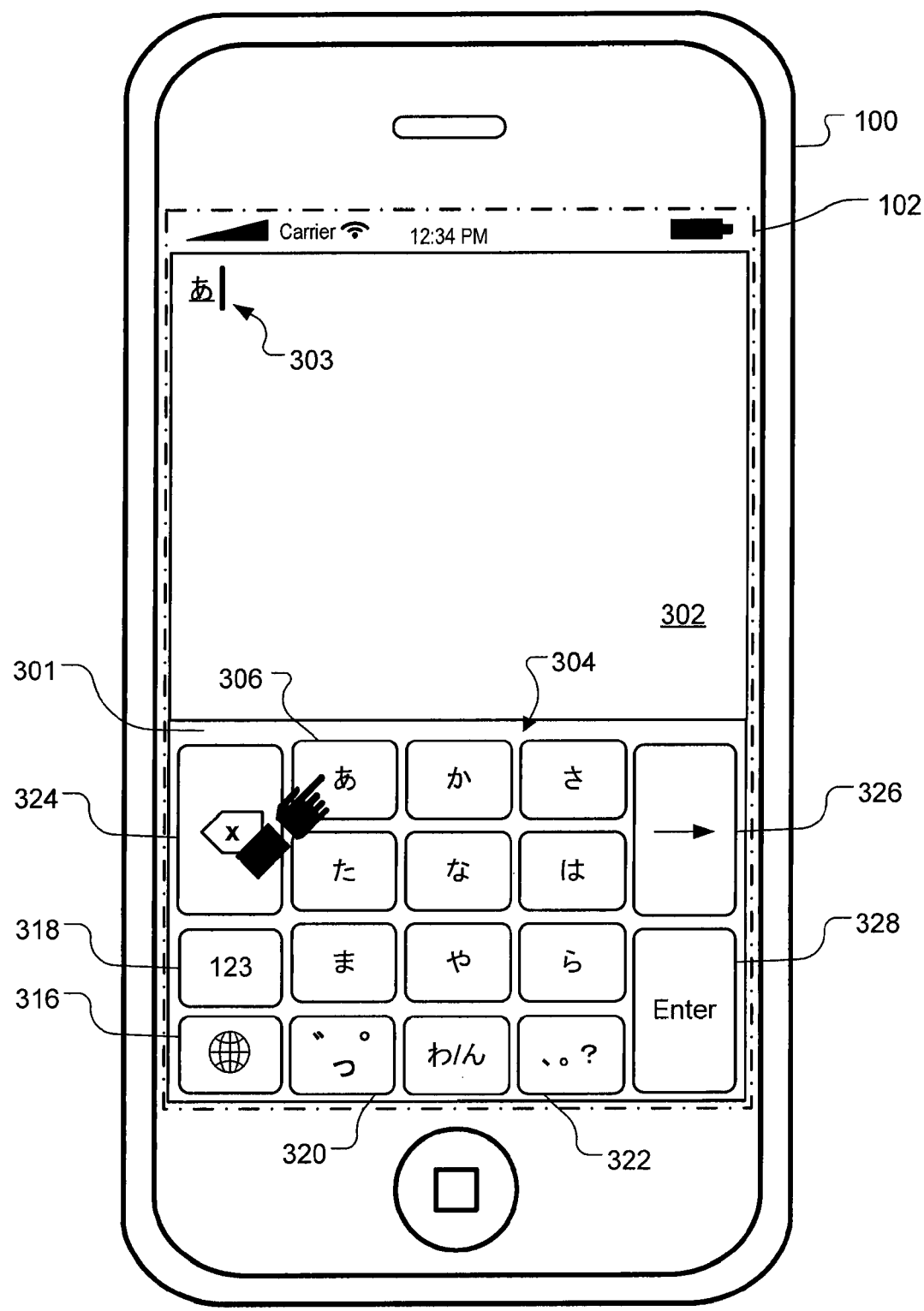
Figure 3C:
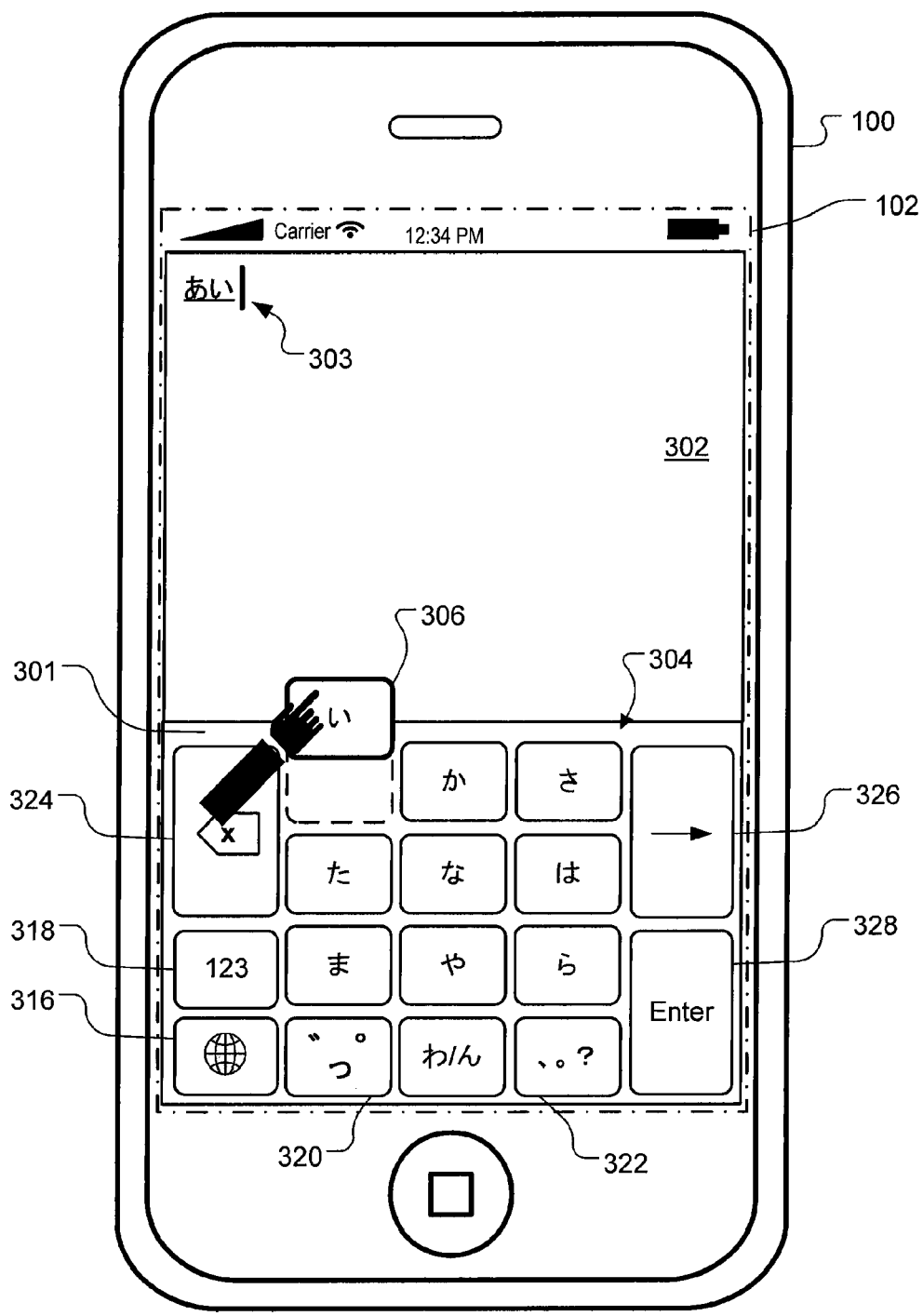

For example, for virtual key 306, a user can enter the kana symbol い by flicking northward on the touch-sensitive display 102 from the initial position of virtual key 306 (indicated by the dotted line), as shown in FIG. 3C. The user can enter the kana symbol う by flicking eastward on the touch-sensitive display 102 from the initial position of virtual key 306. The user can enter the kana symbol え by flicking southward on the touch-sensitive display 102 from the initial position of virtual key 306. The user can enter the kana symbol お by flicking westward on the touch-sensitive display 102 from the initial position of virtual key 306.

Figure 3D:
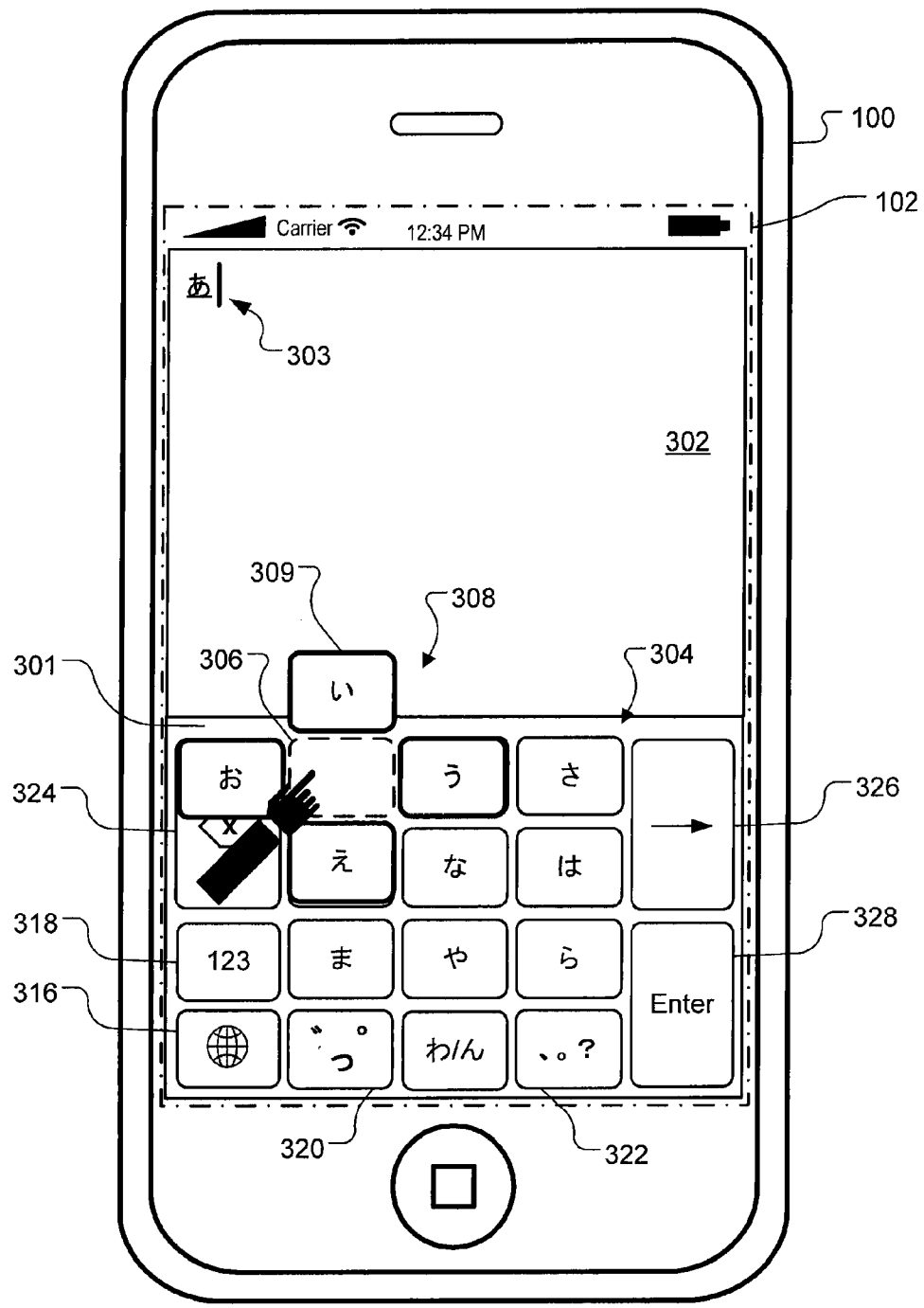
Figure 3E:
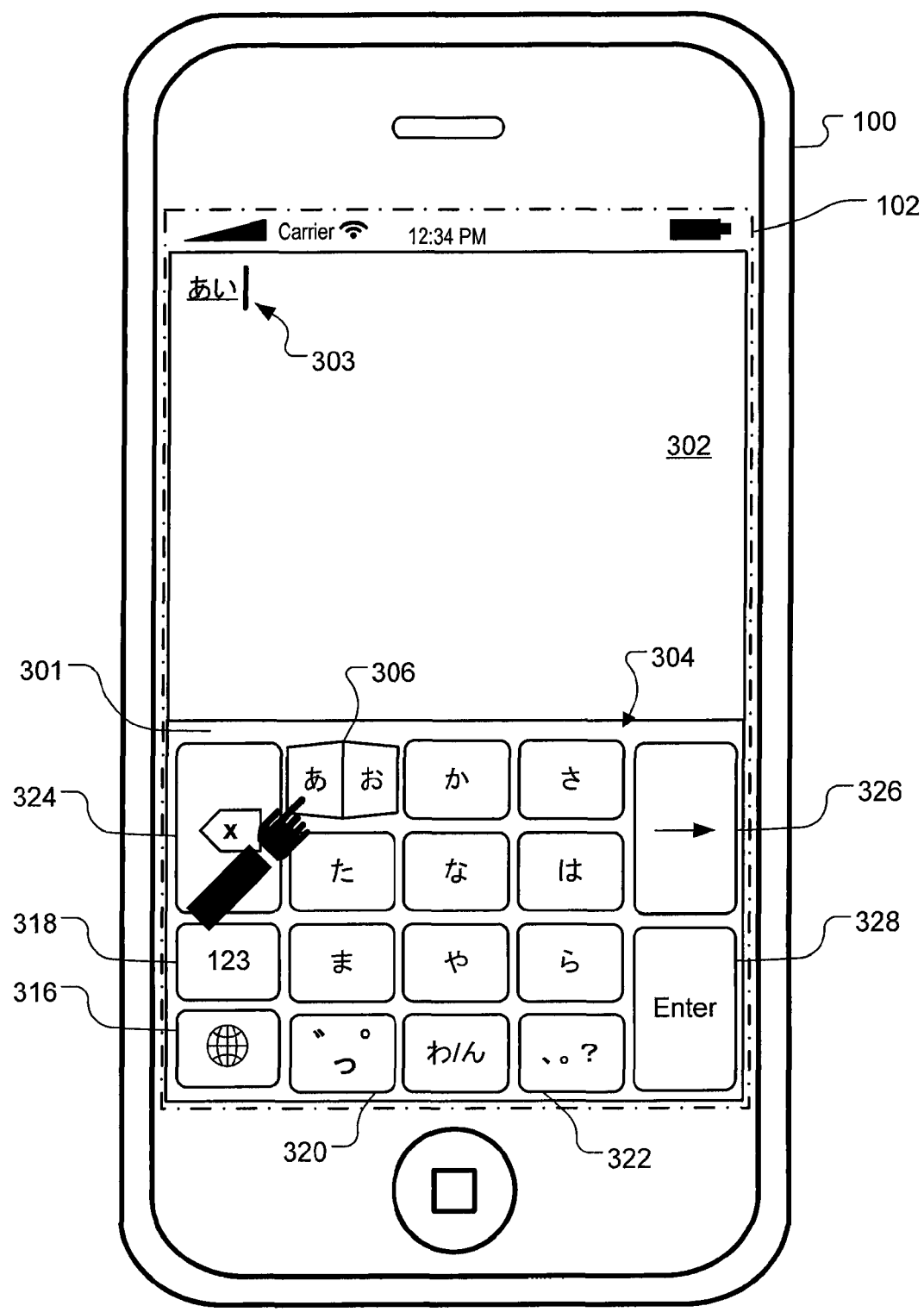

In some implementations, a visual aid indicating the gesture directions for the characters is displayed if the virtual key is touched and held for at least a predetermined amount of time (e.g., 1 second). For example, if virtual key 306 is held for at least 1 second, a visual aid 308 is displayed, as shown in FIG. 3D. Visual aid 308 shows that, for virtual key 306, い can be entered by a northward flick, う can be entered by an eastward flick, え can be entered by a southward flick, and お can be entered by a westward flick.

Figure 7:
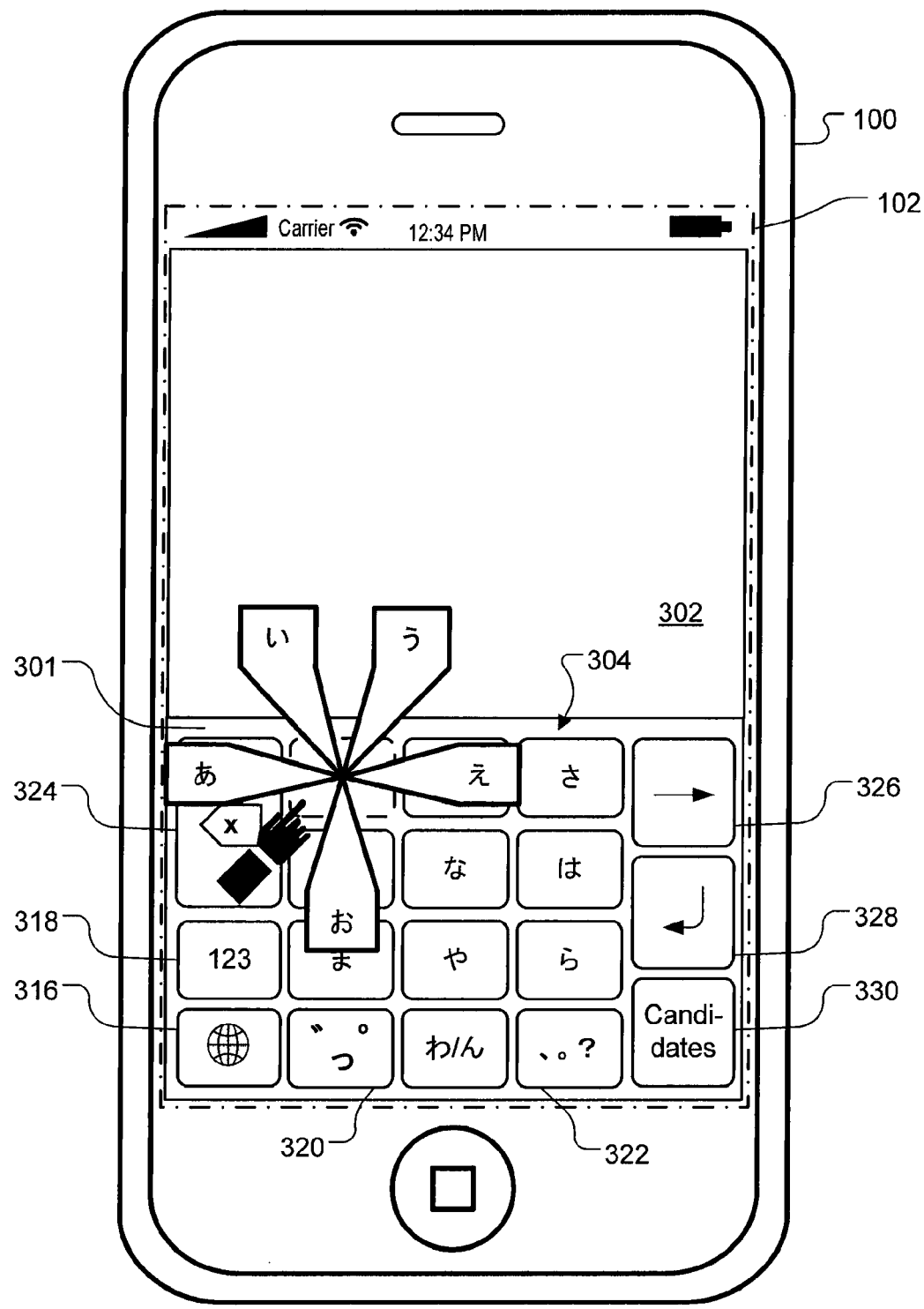
FIGS. 7-8 illustrate example visual aids indicating characters associated with a user interface element.
Figure 8:
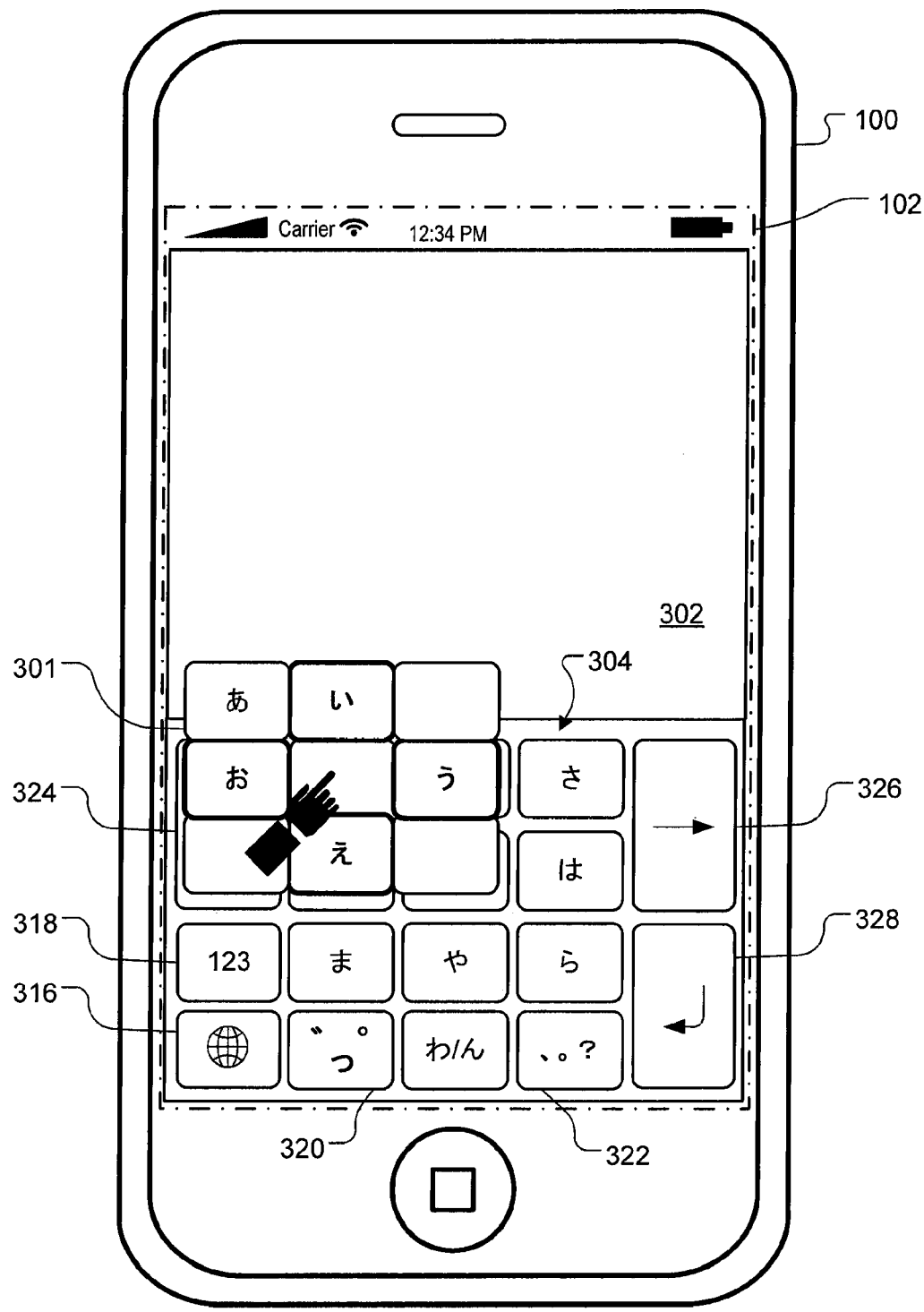

Further examples of visual aids are shown in FIGS. 7 and 8. In FIG. 7, pop-ups indicating the characters radiate from the initial position of the virtual key. In FIG. 8, secondary virtual keys surround the initial position of the virtual key.

In some implementations, as the virtual key is held and the visual aid is displayed, the user can enter a character indicated in the visual aid by tapping the desired character in the visual aid (e.g., by releasing the virtual key and then tapping the desired character in the visual aid before the visual aid disappears from view) and/or sliding their finger on the touch-sensitive display from the virtual key to the desired character in the visual aid. Thus, in FIG. 3D, the user can enter い by, for example, tapping secondary key 309 in the visual aid 308 and/or sliding the finger on the touch-sensitive display 102 from key 306 to secondary key 309 and then releasing.

In some implementations, the virtual key (or whatever user interface element) is displayed to move along with the flick or gesture, as shown in FIG. 3C, for example. In some other implementations, the virtual key or user interface element stays in place.

In some implementations, when the user performs a flick with respect to a virtual key, the virtual key can be displayed as if it is a three-dimensional object rotating in response to the flick. For example, in FIG. 3E, the user performs a flick to the left from virtual key 306. Virtual key 306 is displayed as, for example, a cube or a rectangular prism, that rotates in the direction of the flick and whose faces indicate the characters associated with the key. Thus, in FIG. 3E, virtual key 306 is shown rotating clockwise, where the axis of rotation is vertically parallel to the touch-sensitive display 102, and revealing a face showing the kana symbol お.

Figure 3F:
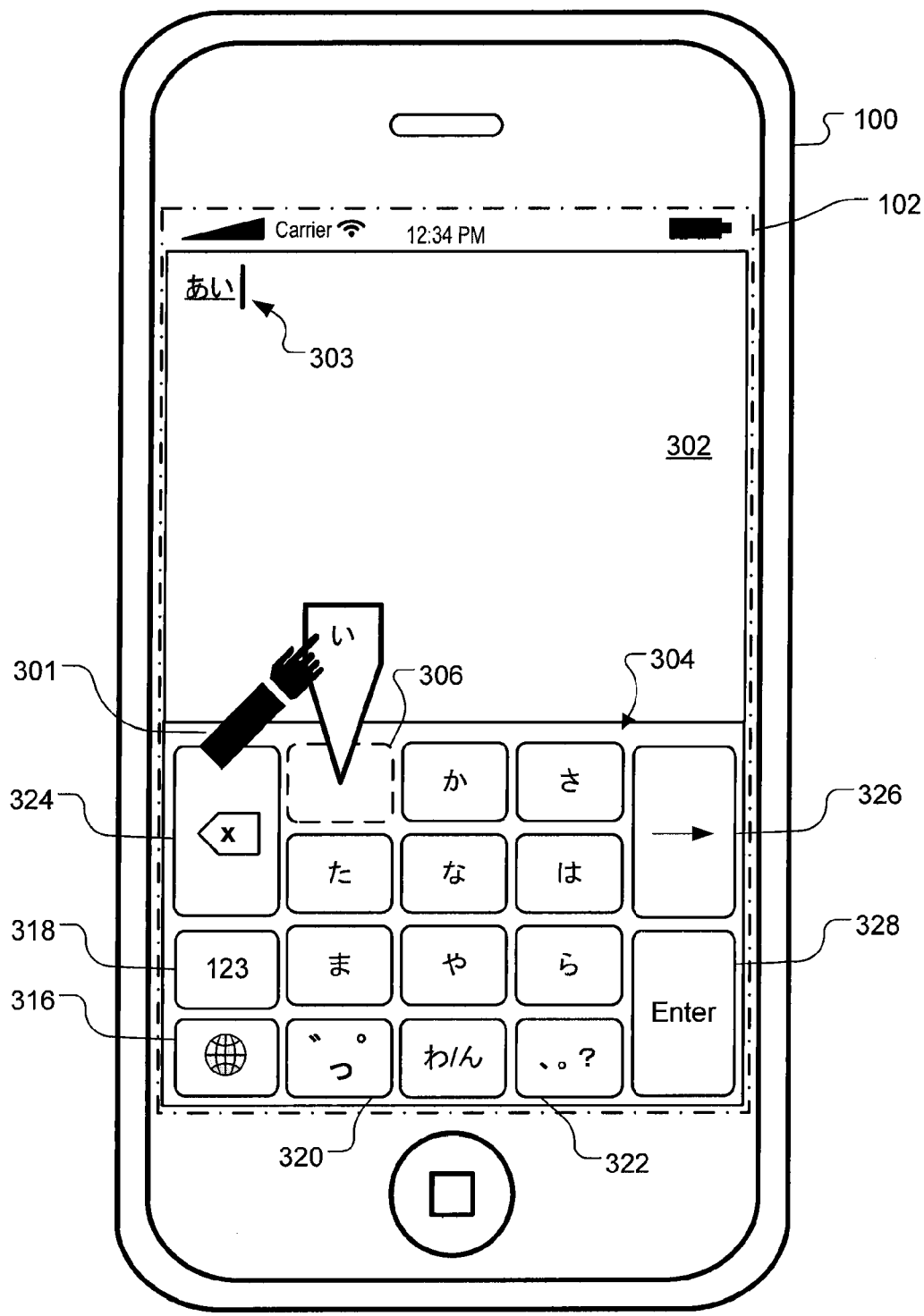

More generally, the user interface element can be displayed with animation or other visual effects in response to a gesture. Examples of animation include, without limitation, the user element moving with the gesture or rotating in space in response to a gesture, as described above. Other visual effects can include, for example, a pop-up showing the entered character as confirmation, as illustrated in FIG. 3F.

Figure 4A:
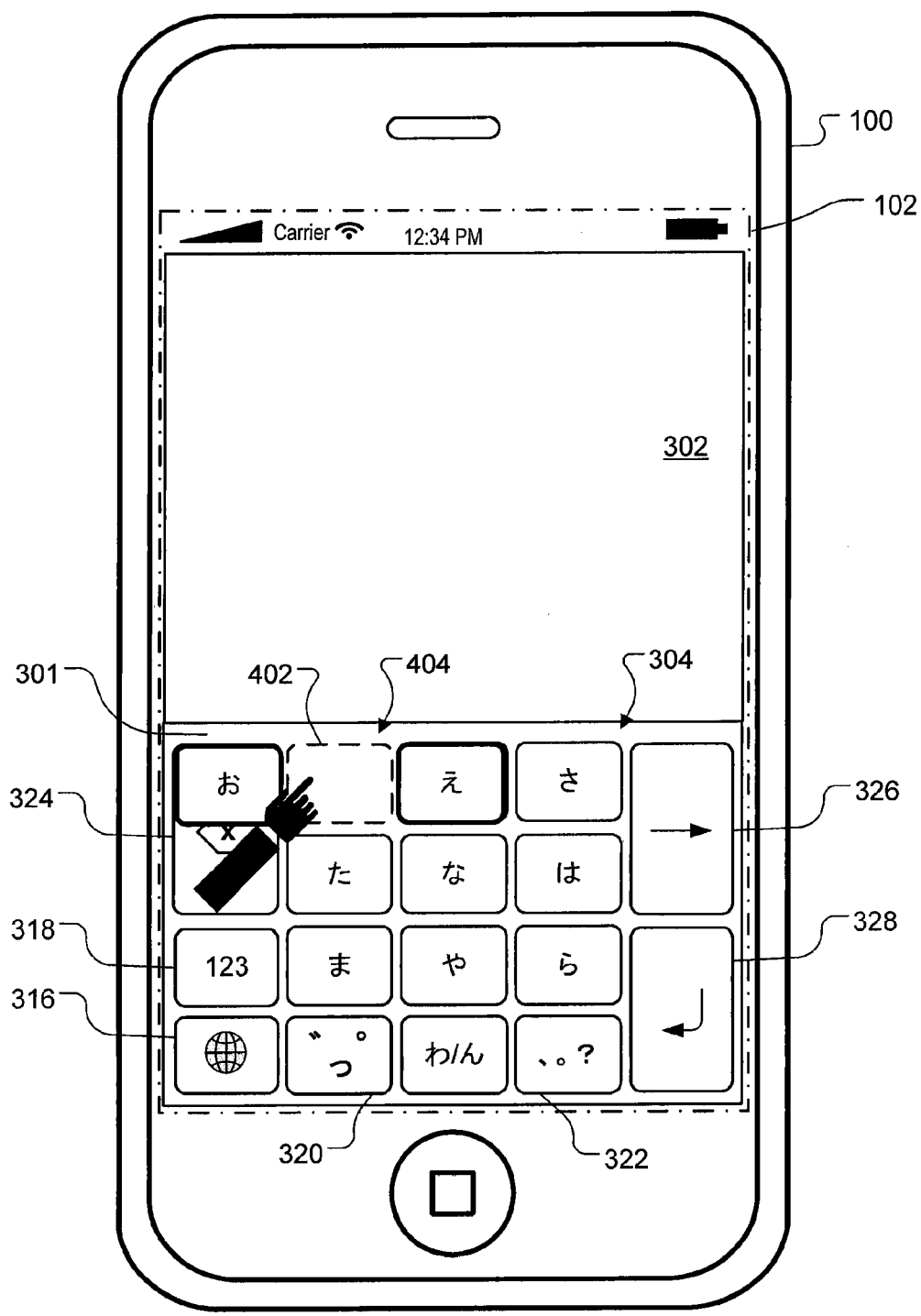
FIGS. 4A-4B illustrate another example user interface for entering text.
Figure 4B:
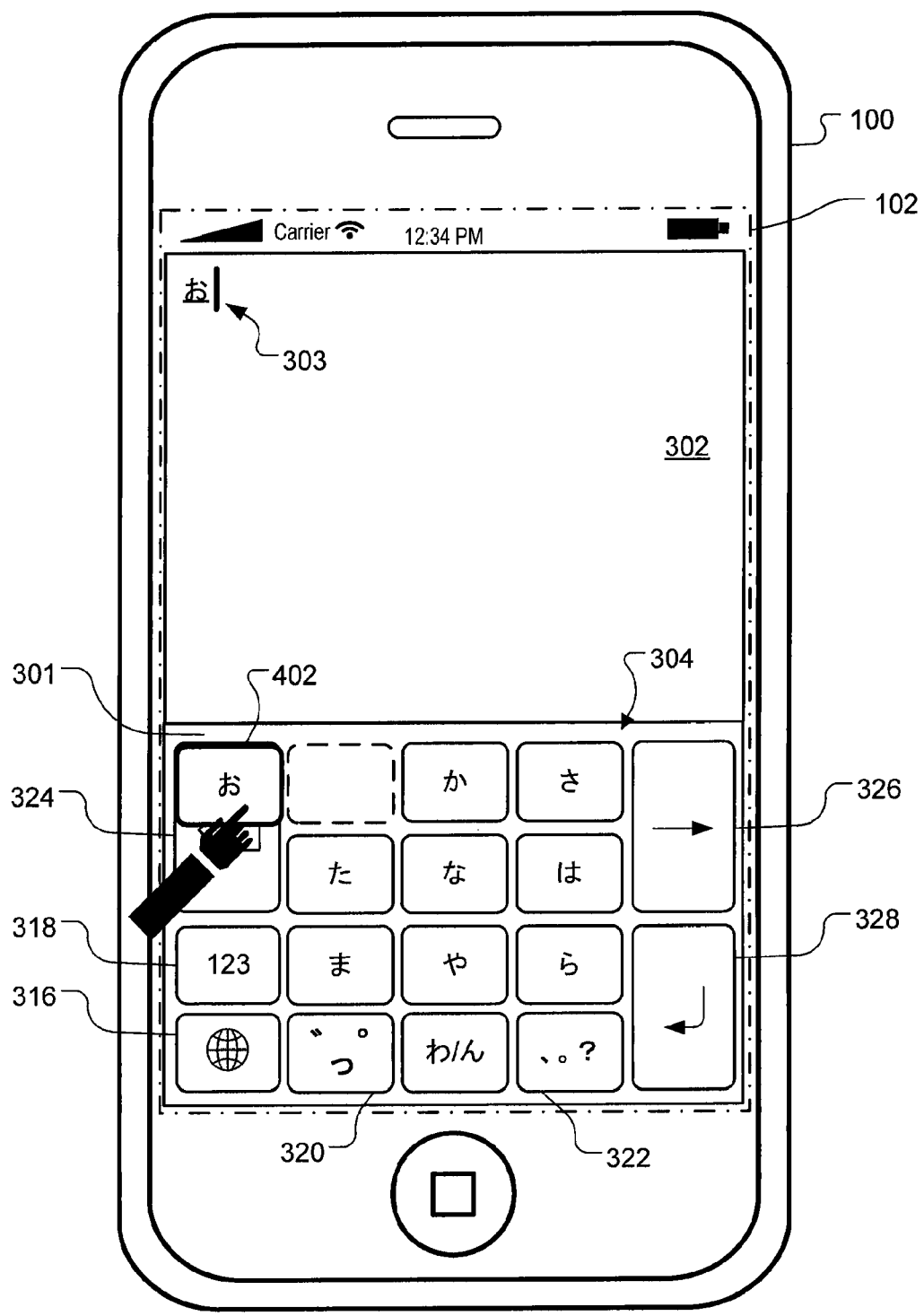

FIGS. 4A-4B illustrate another example user interface for entering text. The interface shown in FIGS. 4A-4B is similar to the interface shown in FIGS. 3A-3E, but with a smaller subset of the characters that can be entered using gestures. For example, for virtual key 402, which is associated with the kana あ, い, う, え, お; え and お can be entered by gestures (e.g., flicking) or multi-tap, while the other kana are entered by multi-tap. Thus, in FIG. 4A, the visual aid 404 from holding key 402 shows え and お, as opposed to い, う, え, and お in FIG. 3D. In FIG. 4B, お is entered by flicking westward from virtual key 402. お is shown as the current input 303.

It should be appreciated that, for a virtual key 304 associated with a plurality of characters, any predetermined number of the plurality of characters associated with the virtual key 304 can be entered using gestures as well as, or instead of, using multi-tap, depending on the implementation. For example, in some implementations, all of the characters associated with a virtual key 304 can be entered using gestures and multi-tap. In some other implementations, less than all of the characters associated with a virtual key 304 can be entered using gestures and multi-tap; some can be entered using only multi-tap.

Figure 5A:
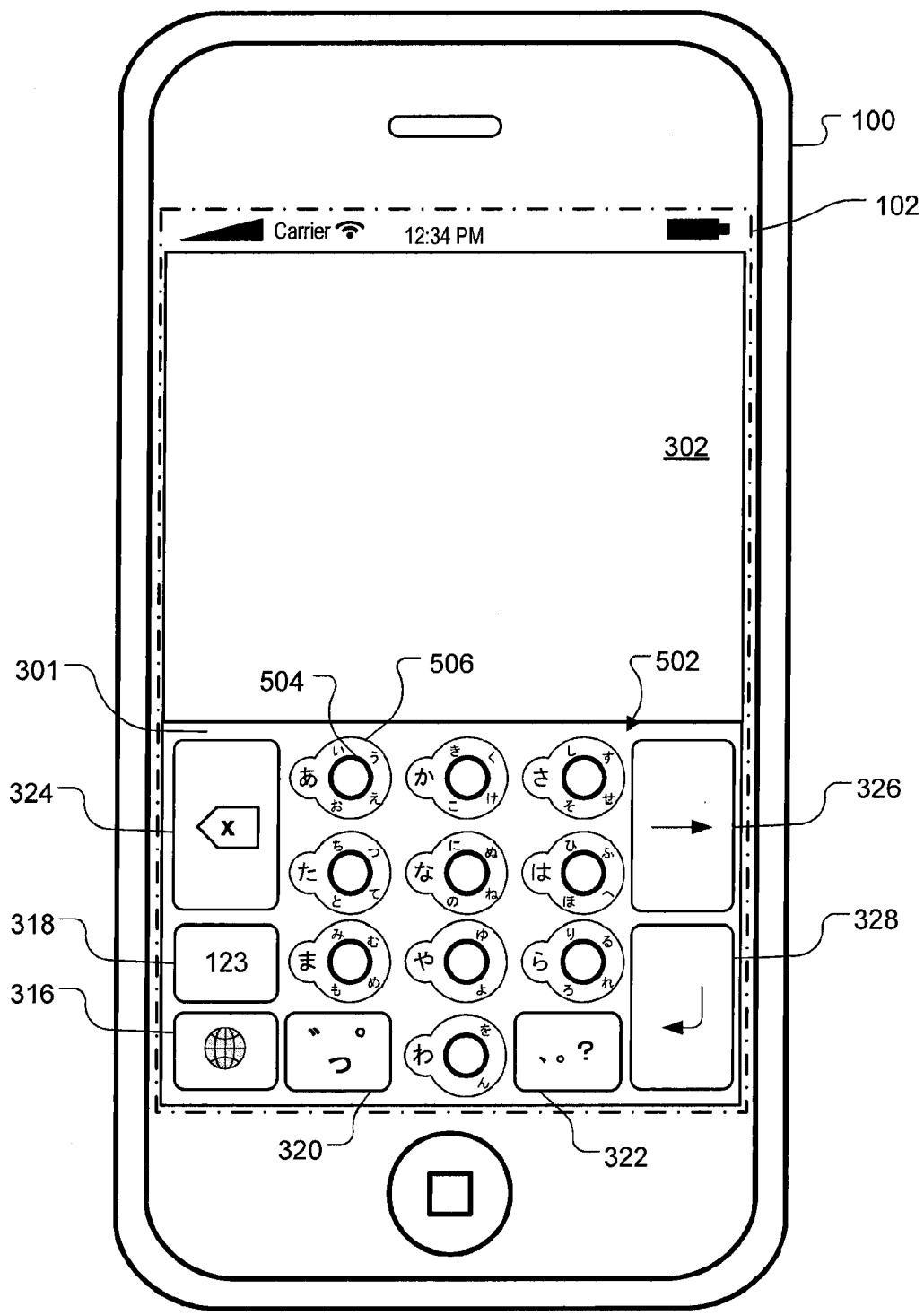
FIGS. 5A-5C illustrate yet another example user interface for entering text.
Figure 5B:
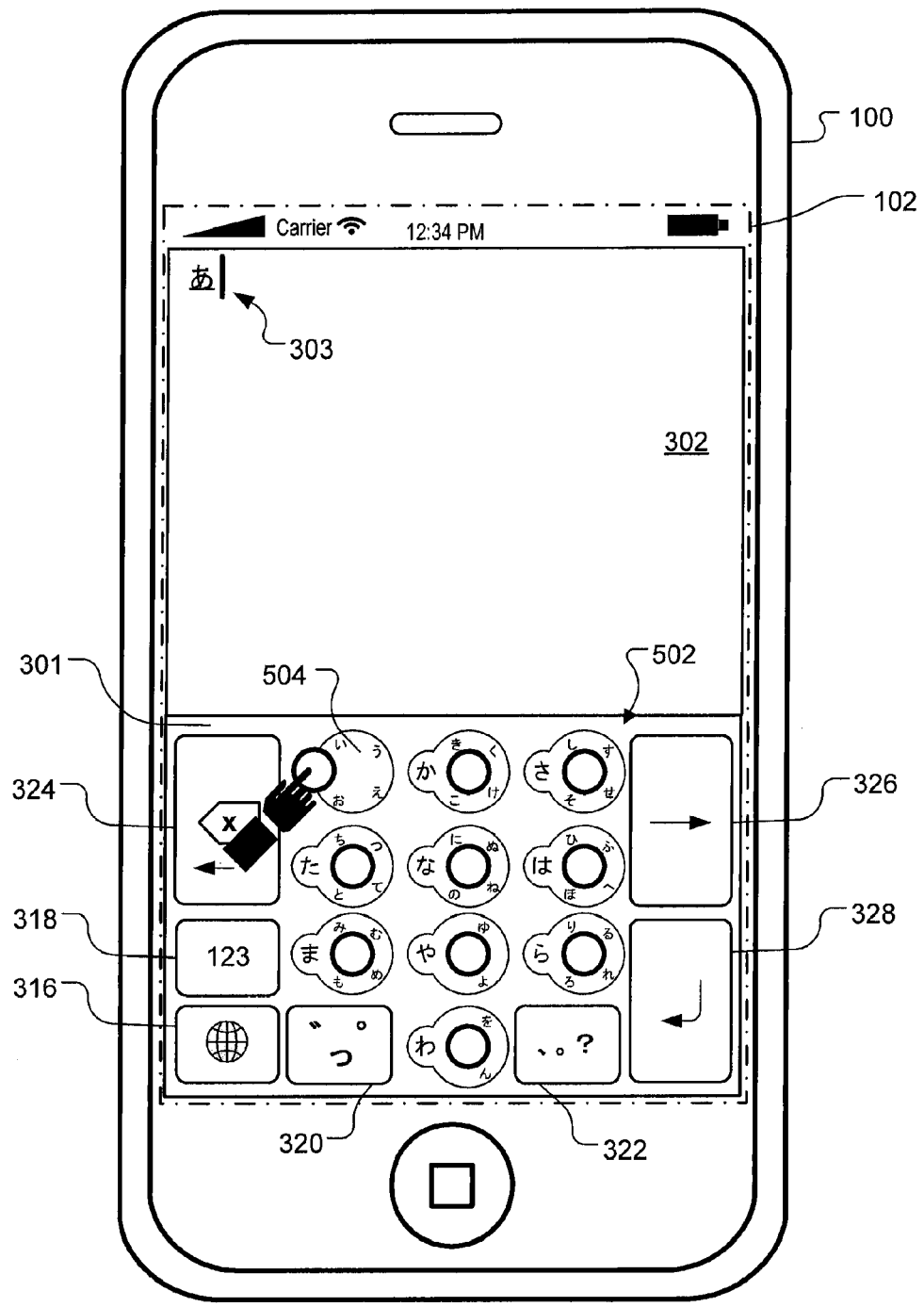
Figure 5C:
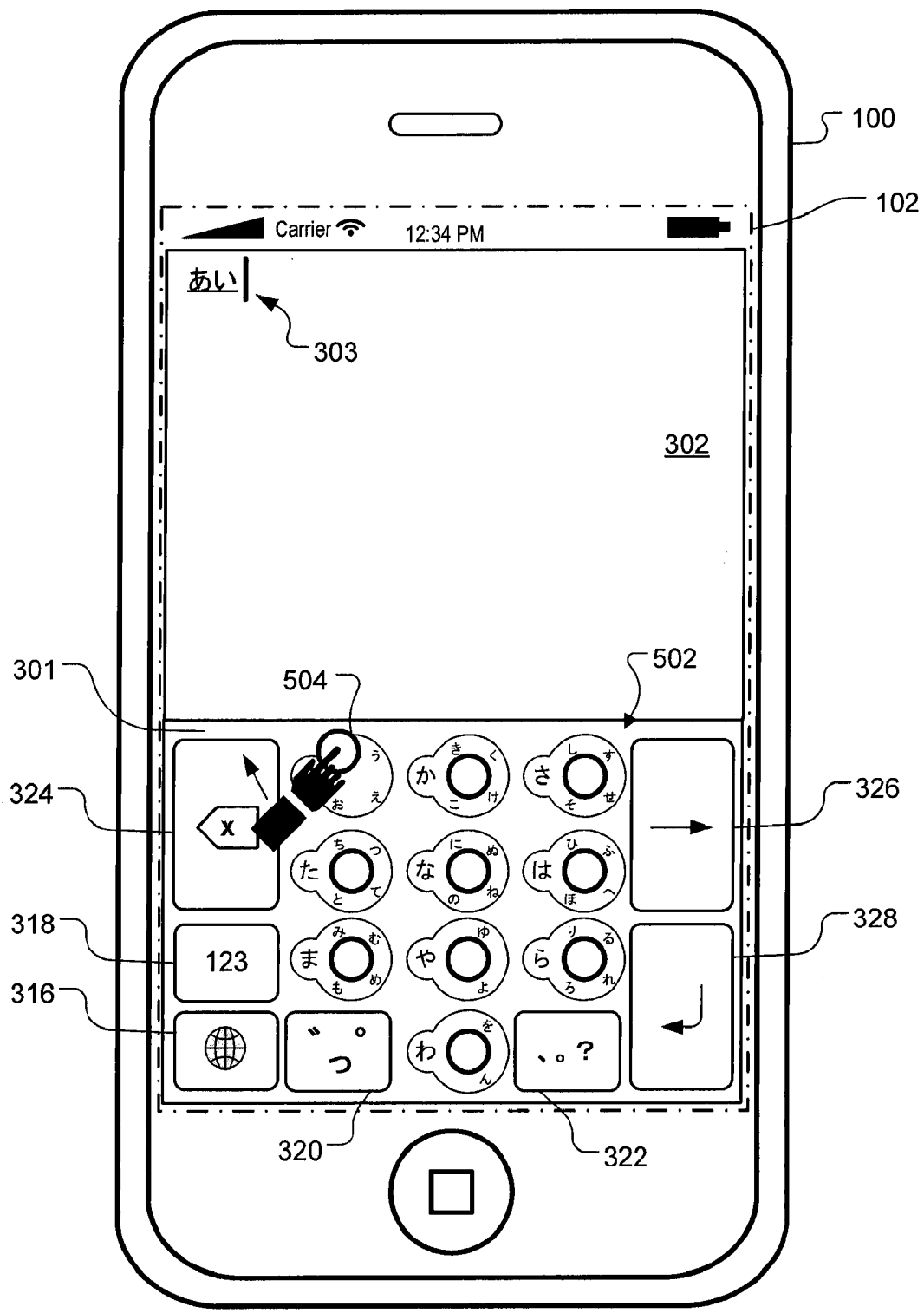

FIGS. 5A-5C illustrate yet another example user interface for entering text. FIG. 5A shows a text entry area 301 that includes a plurality of user interface elements 502 for entering characters using gestures (e.g. flicks in different direction). In some implementations, the user interface elements 502 resemble and behave like joysticks. For example, user interface element 504 is associated with the kana あ, い, う, え, お; a user can enter the associated kana by performing flicks in different directions.

In some implementations, a visual aid showing the characters (e.g., kana) associated with a user interface element 502 and indicating the corresponding gesture directions can be shown with the user interface element 502. For example, visual aid 506 is displayed with the user interface element 504.

A user can enter a character by performing a flick from the initial position of a user interface element 502. For example, in FIG. 5B, a user can enter the kana あ by flicking horizontally westward from the user interface element 504. The entered kana あ is shown as the current input 303. In FIG. 5C, a user can enter the kana い by flicking westward at a northward angle from the user interface element 504; the current input 303 is updated to show the entered kana. In some implementations, the user interface element is displayed to move along with the flick. Thus, for example, as the user performs the flicks with respect to user interface element 504 as described above, the user interface element 504 moves with the motion of the flick as if it is a joystick. In some other implementations, the user interface element stays in place.

In some implementations, the device 100 can, for any of the implementations described above, display a candidates list for a kana string in the current text input 303. The candidate list can include, for example, terms or phrases that include a leading kanji character that has the kana string as a reading. The candidates list can be displayed in the text presentation area 302 and/or the text entry area 301, for example.

As described with respect to the above implementations, a user interface element (e.g., virtual key 304 or element 502) can be conceptualized as representing a gesture-based menu of options that radiate outward in different directions from the user interface element (e.g., a pie menu), where the options in the menu can be characters and can be activated using gestures. The menu can span 360 degrees or be confined to less than 360 degrees. The menu options can use up all of the available directions or less than that. For example, a user interface element associated with five characters can have the characters assigned to the cardinal directions (north, south, east, and west) and the northwest direction with respect to the user interface element, and the southwest, northeast, and southeast directions left blank.

It should be appreciated that the direction assignments described above are merely exemplary. Generally, the characters associated with a user interface element can be pre-assigned directions arbitrarily, and in any order. In some implementations, the convention for assigning the gesture directions for a user interface element is that the initial character in the ordering of characters for the user interface element is assigned to a particular direction (e.g., west in FIG. 7, northwest in FIG. 8). The remaining characters for the user interface element are then assigned in order going clockwise, as shown in FIGS. 7 and 8, for example.

Figure 6:
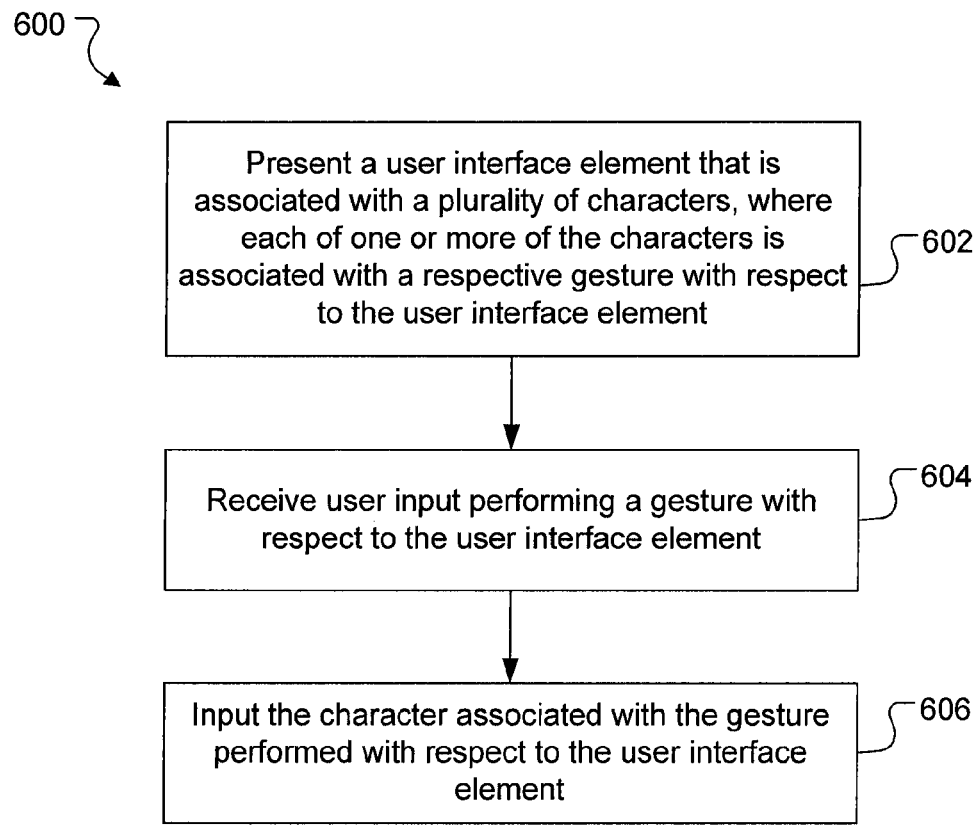
FIG. 6 is a flow diagram of an example process for entering text.

FIG. 6 is a flow diagram of an example process 600 for entering text. For convenience, process 600 will be described with reference to a device (e.g., device 100) that implements the process 600.

A user interface element that is associated with a plurality of characters is presented, where each of at least a subset of the plurality of characters is associated with a respective gesture with respect to the user interface element (602). A device 100, for example, can display a user interface element (e.g., virtual key 306, object 504). The user interface element is associated with a plurality of characters, one or more of which are each associated with a respective gesture with respect to the user interface element. For example, a user interface element can be associated with a plurality of kana symbols, and one or more of these symbols can each be associated with a flick gestures in different direction from the user interface element. In some implementations, a visual aid showing the different directions of the flick gestures and the corresponding characters can be displayed. The visual aid can be displayed by default or in response to a user input (e.g., holding the virtual key).

A user input performing a gesture with respect to the user interface element is received (604). The device 100 can receive and detect, for example, contact on the touch-sensitive display 102 corresponding to a flicking gesture with respect to the user interface element. The character that is entered can be based on the path with respect to the start point and the angle of that path.

The character associated with the gesture performed with respect to the user interface element is inputted (606). The character that is associated with the performed gesture with respect to the user interface element is shown in the current text input. For example, a kana symbol associated with the performed flick in the particular direction is entered and shown in the current text input.

In some implementations, the character selected by the gesture is based on the path taken by the gesture with respect to the start point of the gesture. For example, a flicking gesture can trace a path with a start point and an end point. The start point need not be the center of the user interface element. In some implementations, the direction of the path with respect to the start point determines the character that will be inputted.

In some implementations, at least some of the plurality of characters associated with the user interface element can be input by multi-tap. For example, one or more taps in succession on the user interface element can be detected by the device 100, and one of the plurality of characters is entered based on the taps, or more particularly, based on a number of taps in succession from a standby state or a zero-tap count. For example, for a user interface element associated with あ, い, う, え, and お; あ is entered if there is one tap; い is entered if there are two taps, and so on.

In some implementations, the user interface element can be displayed with animation, or other visual effects can be displayed, in response to the gesture. For example, the user interface element can be displayed as moving with the flicking gesture, in response to the flicking gesture. As another example, the user interface element can be displayed as a three-dimensional object that rotates in space in response to the flicking gesture.

In some implementations, a candidate list can be displayed for a string in the current text input. A candidate list can include one or more candidate replacements for the string. Different types of candidate replacements are possible; examples of candidate replacements include suggested spelling corrections based on a dictionary, suggested terms from an auto-completion feature, kanji that have a kana input string as a reading, etc. A user can accept the input string as is, select a candidate replacement, or edit the string, for example.

It should be appreciated that while the implementations above are described with respect to entry of Japanese language text, the above-described implementations can be adapted for use with other languages.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
    providing a user interface element for presentation on a touch-sensitive display of a device, the user interface element being associated with a plurality of characters, wherein each of the plurality of characters is associated with a respective gesture with respect to the user interface element;
    receiving a flick gesture in a first direction with respect to the user interface element, the flick gesture including an initial contact with the user interface element on the touch-sensitive display;
    in response to the initial contact, providing for presentation a plurality of visual aids, each visual aid including one of the plurality of characters displayed outside of the user interface element, wherein providing for presentation the visual aids comprises causing the visual aids to be displayed in a radiating pattern such that each visual aid indicates a direction associated with the character included in the visual aid, wherein the flick gesture further includes a liftoff without contacting any of the plurality of visual aids on the touch-sensitive display; and
    inputting, based on the received flick gesture in the first direction, a character displayed in a visual aid, the displayed character associated with the first direction.

2. The method of claim 1, wherein the plurality of characters comprise Japanese kana symbols.

3. The method of claim 1, wherein the user interface element is a virtual key.

4. The method of claim 3, further comprising:
    receiving input tapping the virtual key one or more times; and
    inputting one of the plurality of characters based on the tapping of the virtual key.

5. The method of claim 1, wherein:
    the respective gesture with respect to the user interface element comprises a flick with respect to the user interface element on the touch sensitive display.

6. The method of claim 5, wherein each of the plurality of characters is associated with a flick in a respective direction with respect to the user interface element.

7. The method of claim 6, wherein the visual aids indicate the respective directions for the respective flicks.

8. The method of claim 1, comprising presenting the user interface element with animation in response to the gesture.

9. The method of claim 8, wherein presenting the user interface element with animation in response to the gesture comprises presenting the user interface element as a three dimensional object that is rotating in response to the gesture.

10. The method of claim 8, wherein presenting the user interface element with animation in response to the gesture comprises presenting the user interface element as moving along with the gesture.

11. The method of claim 8, wherein presenting the user interface element with animation in response to the gesture comprises presenting a confirmation pop-up indicating the inputted character.

12. The method of claim 1, wherein causing the visual aids to pop up in a radiating pattern comprises:
    causing at least one of the visual aids to pop up in a direction north of the user interface element;

causing at least one of the visual aids to pop up in a direction south of the user interface element;
causing at least one of the visual aids to pop up in a direction east of the user interface element; and
causing at least one of the visual aids to pop up in a direction west of the user interface element.

13. A portable device comprising:
a touch-sensitive display;
memory;
one or more processors; and
instructions stored in the memory and configured to, upon execution, cause the one or more processors to perform operations comprising:
providing a user interface element for presentation on a touch-sensitive display of a device, the user interface element being associated with a plurality of characters, wherein each of the plurality of characters is associated with a respective gesture with respect to the user interface element;
receiving a flick gesture in a first direction with respect to the user interface element, the flick gesture including an initial contact with the user interface element on the touch-sensitive display;
in response to the initial contact, providing for presentation a plurality of visual aids, each visual aid including one of the plurality of characters displayed outside of the user interface element, wherein providing for presentation the visual aids comprises causing the visual aids to be displayed in a radiating pattern such that each visual aid indicates a direction associated with the character included in the visual aid, wherein the flick gesture further includes a liftoff without contacting any of the plurality of visual aids on the touch-sensitive display; and
inputting, based on the received flick gesture in the first direction, a character displayed in a visual aid, the displayed character associated with the first direction.

14. The portable device of claim 13, wherein causing the visual aids to pop up in a radiating pattern comprises:
causing at least one of the visual aids to pop up in a direction north of the user interface element;
causing at least one of the visual aids to pop up in a direction south of the user interface element;
causing at least one of the visual aids to pop up in a direction east of the user interface element; and
causing at least one of the visual aids to pop up in a direction west of the user interface element.

15. A computer program product, encoded on a tangible program carrier, operable to cause a portable device to perform operations comprising:
providing a user interface element for presentation on a touch-sensitive display of a device, the user interface element being associated with a plurality of characters, wherein each of the plurality of characters is associated with a respective gesture with respect to the user interface element;
receiving a flick gesture in a first direction with respect to the user interface element, the flick gesture including an initial contact with the user interface element on the touch-sensitive display;
in response to the initial contact, providing for presentation a plurality of visual aids, each visual aid including one of the plurality of characters displayed outside of the user interface element, wherein providing for presentation the visual aids comprises causing the visual aids to be displayed in a radiating pattern such that each visual aid indicates a direction associated with the character included in the visual aid, wherein the flick gesture further includes a liftoff without contacting any of the plurality of visual aids on the touch-sensitive display; and
inputting, based on the received flick gesture in the first direction, a character displayed in a visual aid, the displayed character associated with the first direction.

16. The product of claim 15, wherein the plurality of characters comprise Japanese kana symbols.

17. The product of claim 16, wherein the user interface element and visual aids are grouped in gojūon order, wherein the user interface element corresponds to a gojūon group and each of the visual aids corresponds to a distinct vowel of the gojūon group.

18. The product of claim 15, wherein the user interface element is configured to respond to the gesture in a joystick-like manner.

19. The product of claim 15, wherein the selection action includes a flick moving in a direction of the visual aid displaying the character.

20. The product of claim 15, comprising presenting the user interface element with animation in response to the gesture.

* * * * *